United States Patent
Dobrinsky et al.

(10) Patent No.: US 11,656,387 B2
(45) Date of Patent: *May 23, 2023

(54) LIGHT EMITTING DEVICE FOR EMITTING DIFFUSE LIGHT

(71) Applicant: Sensor Electronic Technology, Inc., Columbia, SC (US)

(72) Inventors: Alexander Dobrinsky, Vienna, VA (US); Michael Shur, Vienna, VA (US)

(73) Assignee: Sensor Electronic Technology, Inc., Columbia, SC (US)

(*) Notice: Subject to any disclaimer, the term of this patent is extended or adjusted under 35 U.S.C. 154(b) by 0 days.

This patent is subject to a terminal disclaimer.

(21) Appl. No.: 17/498,131

(22) Filed: Oct. 11, 2021

(65) Prior Publication Data
US 2022/0026607 A1     Jan. 27, 2022

Related U.S. Application Data

(63) Continuation of application No. 16/926,934, filed on Jul. 13, 2020, now Pat. No. 11,143,799, which is a continuation of application No. 16/166,882, filed on Oct. 22, 2018, now Pat. No. 10,712,480, which is a continuation-in-part of application No. 15/444,799, filed on Feb. 28, 2017, now Pat. No. 10,107,944.

(60) Provisional application No. 62/301,015, filed on Feb. 29, 2016.

(51) Int. Cl.
*G02B 5/02* (2006.01)
*G02B 6/12* (2006.01)
*H05B 33/12* (2006.01)
*G02B 6/122* (2006.01)

(52) U.S. Cl.
CPC ......... *G02B 5/0294* (2013.01); *G02B 5/0242* (2013.01); *G02B 5/0278* (2013.01); *G02B 6/122* (2013.01); *H05B 33/12* (2013.01)

(58) Field of Classification Search
CPC ..... G02B 5/0294; G02B 5/0278; G02B 6/122
USPC ............... 250/493.1, 494.1, 504 R, 504 H
See application file for complete search history.

(56) References Cited

U.S. PATENT DOCUMENTS

| | | |
|---|---|---|
| 5,165,772 A | 11/1992 | Wu |
| 5,295,047 A | 3/1994 | Windross |
| 5,590,945 A | 1/1997 | Simms |

(Continued)

OTHER PUBLICATIONS

Ippolito, N., U.S. Appl. No. 16/166,882, Notice of Allowance, dated Mar. 10, 2020, 8 pages.

(Continued)

*Primary Examiner* — Nicole M Ippolito
(74) *Attorney, Agent, or Firm* — LaBatt, LLC

(57) ABSTRACT

A diffusive layer including a laminate of a plurality of transparent films is provided. At least one of the plurality of transparent films includes a plurality of diffusive elements with a concentration that is less than a percolation threshold. The plurality of diffusive elements are optical elements that diffuse light that is impinging on such element. The plurality of diffusive elements can be diffusively reflective, diffusively transmitting or combination of both. The plurality of diffusive elements can include fibers, grains, domains, and/or the like. The at least one film can also include a powder material for improving the diffusive emission of radiation and a plurality of particles that are fluorescent when exposed to radiation.

20 Claims, 8 Drawing Sheets

(56) References Cited

U.S. PATENT DOCUMENTS

| | | | |
|---|---|---|---|
| 5,835,661 A | 11/1998 | Tai et al. | |
| 9,550,004 B2 | 1/2017 | Smetona et al. | |
| 10,107,944 B2 | 10/2018 | Dobrinsky et al. | |
| 10,712,480 B2 * | 7/2020 | Dobrinsky | H05B 33/12 |
| 11,143,799 B2 * | 10/2021 | Dobrinsky | G02B 5/0289 |
| 2008/0310169 A1 | 12/2008 | Chen et al. | |
| 2013/0004749 A1 | 1/2013 | Hao et al. | |
| 2016/0074548 A1 | 3/2016 | Dobrinsky et al. | |
| 2017/0031194 A1 | 2/2017 | Uri et al. | |
| 2017/0095585 A1 | 4/2017 | Smetona et al. | |
| 2017/0248744 A1 | 8/2017 | Dobrinsky et al. | |
| 2019/0056538 A1 | 2/2019 | Dobrinsky et al. | |

OTHER PUBLICATIONS

Ippolito, N., U.S. Appl. No. 16/166,882, Office Action 1, dated Nov. 1, 2019, 5 pages.

Ippolito, N., U.S. Appl. No. 15/444,799, Notice of Allowance, dated Jun. 26, 2018, 26 pages.

Ippolito, N., U.S. Appl. No. 16/926,934, Office Action1, dated Jan. 26, 2021, 5 pages.

Ippolito, N., U.S. Appl. No. 16/926,934, Notice of Allowance, dated Jun. 15, 2021, 8 pages.

* cited by examiner

LIGHT EMITTING DEVICE FOR EMITTING DIFFUSE LIGHT

REFERENCE TO RELATED APPLICATIONS

The current application is a continuation of U.S. patent application Ser. No. 16/926,934, filed on 13 Jul. 2020, which is a continuation of U.S. patent application Ser. No. 16/166,882, filed on 22 Oct. 2018, which is a continuation-in-part application of U.S. patent application Ser. No. 15/444,799, filed on 28 Feb. 2017, which claims the benefit of U.S. Provisional Application No. 62/301,015, filed on 29 Feb. 2016, each of which is hereby incorporated by reference. Aspects of the invention described herein are related to U.S. patent application Ser. No. 14/478,266, filed on 5 Sep. 2014, which is hereby incorporated by reference.

TECHNICAL FIELD

The disclosure relates generally to emitting devices, and more particularly, to a diffusive layer for an emitting device in order to improve diffusive light emission.

BACKGROUND ART

When using discrete light sources, such as light emitting diodes, to create an illumination effect, there is a need for blending the illumination created by these discrete light sources into a uniform lighting condition. For example, a linear array of discrete light sources will produce non-uniform emission which can be very detrimental for sterilization purposes.

Light guides made from a high refractive index material have been successfully employed to create a line of light from a point source. For example, one approach discloses an optical element that uses a total-internal reflection light guide to create a line of light from one or two light emitting diode point sources by internally reflecting the light along an axis, wherein beams of light escape the light pipe along the axis of the pipe. This form of lighting apparatus is designed such that the light guide is to be hidden inside a wall or panel. In addition, the length of the light line created is limited by the constraints on the length of the mold used to create the light guides. Other approaches also use total internal reflection to create a line of light from a point source. While these approaches achieve a sufficiently thin line of light, the length of the line is effectively limited and the light guides cannot be easily configured end-to-end to create a longer continuous line of light. Furthermore, these approaches use a very limited number of light sources, which in turn restricts the luminance and perceived visual brightness of the resulting line. The approaches use light guides to direct a point source of light into a line of light, so each approach is limited on luminance. As such, a line of light with high luminance and sufficient length cannot be achieved. An additional drawback is the fact that only a single pattern is achievable with this type of display. Furthermore, for ultraviolet light emitting devices, long light guiding layers are expensive.

SUMMARY OF THE INVENTION

Aspects of the invention provide a diffusive layer including a laminate of a plurality of transparent films. At least one of the plurality of transparent films includes a plurality of diffusive elements with a concentration that is less than a percolation threshold. The plurality of diffusive elements are optical elements that diffuse light that is impinging on such element. The plurality of diffusive elements can be diffusively reflective, diffusively transmitting or combination of both. The plurality of diffusive elements can include fibers, grains, domains, and/or the like. The at least one film can also include a powder material for improving diffusive emission of radiation and a plurality of particles that are fluorescent when exposed to the radiation.

A first aspect of the invention provides a device, comprising: a set of radiation sources configured to emit radiation; and a diffusive layer located adjacent to the set of radiation sources, the diffusive layer including a plurality of transparent films, wherein at least one of the transparent films includes a plurality of diffusive elements, and wherein a concentration of the plurality of diffusive elements is below a percolation threshold.

A second aspect of the invention provides a device, comprising: a set of radiation sources configured to emit radiation; and a diffusive layer located adjacent to the set of radiation sources, the diffusive layer including a plurality of transparent films, wherein at least one of the transparent films is formed of a fluoropolymer and at least one of the transparent films is formed of a fluoropolymer composite material including a fluoropolymer and a plurality of diffusive elements, and wherein a concentration of the plurality of diffusive elements is below a percolation threshold.

A third aspect of the invention provides an enclosure, comprising: a plurality of radiation sources configured to emit radiation; a plurality of mirror elements, wherein each radiation source is located above a mirror element; and a diffusive layer located on a side of the enclosure opposite of the plurality of radiation sources, the diffusive layer including a plurality of transparent films, wherein at least one of the transparent films includes a plurality of diffusive elements, and wherein a concentration of the plurality of diffusive elements is below a percolation threshold.

The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

FIG. 9A shows an illustrative device according to an embodiment, while

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1:
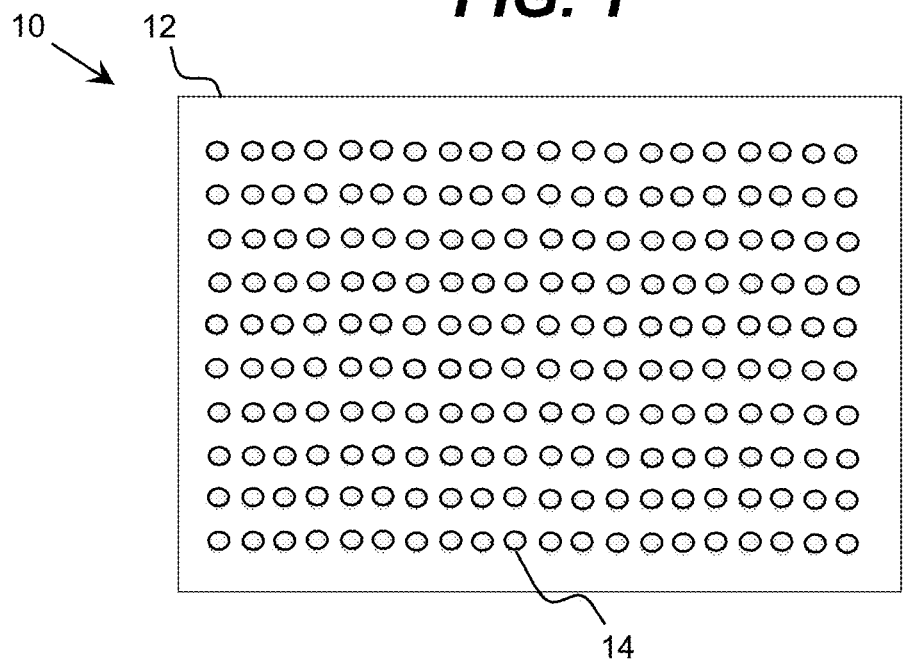
FIG. 1 shows an illustrative diffusive layer according to an embodiment.

As indicated above, aspects of the invention provide a diffusive layer including a laminate of a plurality of transparent films. At least one of the plurality of transparent films includes a plurality of diffusive elements with a concentration that is less than a percolation threshold. The plurality of diffusive elements are optical elements that diffuse light that is impinging on such element. The plurality of diffusive elements can be diffusively reflective, diffusively transmitting or combination of both. The plurality of diffusive elements can include fibers, grains, domains, and/or the like. The at least one film can also include a powder material for improving diffusive emission of radiation and a plurality of particles that are fluorescent when exposed to the radiation.

As used herein, unless otherwise noted, the term "set" means one or more (i.e., at least one) and the phrase "any solution" means any now known or later developed solution. Furthermore, as used herein, ultraviolet radiation/light means electromagnetic radiation having a wavelength ranging from approximately 10 nanometers (nm) to approximately 400 nm, while ultraviolet-C (UV-C) means electromagnetic radiation having a wavelength ranging from approximately 100 nm to approximately 280 nm, ultraviolet-B (UV-B) means electromagnetic radiation having a wavelength ranging from approximately 280 to approximately 315 nanometers, and ultraviolet-A (UV-A) means electromagnetic radiation having a wavelength ranging from approximately 315 to approximately 400 nanometers.

It is understood that, unless otherwise specified, each value is approximate and each range of values included herein is inclusive of the end values defining the range. As used herein, unless otherwise noted, the term "approximately" is inclusive of values within +/−ten percent of the stated value, while the term "substantially" is inclusive of values within +/−five percent of the stated value. Unless otherwise stated, two values are "similar" when the smaller value is within +/−twenty-five percent of the larger value. A value, y, is on the order of a stated value, x, when the value y satisfies the formula $0.1x \leq y \leq 10x$. As used herein, a "characteristic size" of an object corresponds to a measurement of the physical size of the object that defines its influence on a system.

As also used herein, a layer is a transparent layer when the layer allows at least ten percent of radiation having a target wavelength, which is radiated at a normal incidence to an interface of the layer, to pass there through. Furthermore, as used herein, a layer is a reflective layer when the layer reflects at least ten percent of radiation having a target wavelength, which is radiated at a normal incidence to an interface of the layer. In an embodiment, the target wavelength of the radiation corresponds to a wavelength of radiation emitted or sensed (e.g., peak wavelength +/−five nanometers) by an active region of an optoelectronic device during operation of the device. For a given layer, the wavelength can be measured in a material of consideration and can depend on a refractive index of the material.

Turning to the drawings, FIG. 1 shows an illustrative diffusive layer 10 according to an embodiment. The diffusive layer 10 can be used to diffusively reflect radiation emitted from a set of light emitting diodes (not shown) located adjacent to the diffusive layer 10. In an illustrative embodiment, the diffusively reflected ultraviolet radiation can be used to disinfect a set of articles. In an embodiment, the diffusive layer 10 can be used to diffusively reflect radiation from other emitters, such as a high intensity ultraviolet lamp (e.g., a high intensity mercury lamp), a discharge lamp, super luminescent LEDs, laser diodes, and/or the like. The set of light emitting diodes can be manufactured with one or more layers of materials selected from the group-III nitride material system (e.g., $Al_xIn_yGa_{1-x-y}N$, where $0 \leq x$, $y \leq 1$, and $x+y \leq 1$ and/or alloys thereof).

The diffusive layer 10 comprises a transparent film 12 or a plurality of transparent films 12 with at least one film including a plurality of diffusive reflective or transmitting elements 14. In an embodiment, the plurality of transparent films 12, and therefore the diffusive layer 10, can have a transparency of at least 30% to radiation directed perpendicular to the surface of the plurality of transparent films 12. The plurality of transparent films 12 can be merged together though any process. For example, the plurality of transparent films 12 can be merged together using a melting process, which can include, but is not limited to placing the plurality of transparent films 12 in an oven and heating the plurality of transparent films 12 to a temperature that leads to the plurality of films melting. In another embodiment, the diffusive layer 10 can comprise an alloy or mixture of several fluoropolymer films. Each of the plurality of transparent films 12 can comprise a fluoropolymer, such as Teflon®, fluorinated ethylene-propylene (EFEP), ethylene-tetrafluoroethylene (ETFE), and/or the like. In an embodiment, more than one polymer material can be used to fabricate the diffusive layer 10.

In an embodiment, at least one transparent film in the plurality of transparent films 12 includes a plurality of diffusively reflecting or transmitting elements 14. In an embodiment, the plurality of diffusively reflecting or transmitting elements 14 can be immersed within the at least one transparent film. It is understood that the plurality of diffusively reflecting or transmitting elements 14 can be located in any portion of the at least one transparent film (e.g., on the surface of the at least one film, partially embedded within a top or bottom surface of the at least one film, or completely embedded within the at least one film). In an embodiment, at least one film in the plurality of transparent films 12 is a light guiding layer. The plurality of reflecting elements 14 can comprise grains, domains, fibers, elongated fibers, spheres, and/or the like. In an embodiment, the plurality of diffusively reflecting or transmitting elements 14 can be formed of fibers that form a periodic structure. In an embodiment, a concentration (e.g., density) of the plurality of diffusively reflecting or transmitting elements 14 is below a percolation threshold. This is to ensure that the plurality of diffusively reflecting elements 14 do not form a large cluster of physically touching elements. In an embodiment, small clusters of physically touching elements 14 can be formed. A characteristic size (e.g., diameter) of each small cluster is at most 5% of the characteristic size of the plurality of the diffusively reflecting or transmitting elements 14. The plurality of diffusively reflecting elements 14 can be in an ordered or random arrangement. In an embodiment, the concentration of the plurality of diffusively reflecting elements 14 can be periodically spatially modulated, with the modulation period comparable to or larger than the peak wavelength of the emitted radiation from the set of light emitting diodes (not shown). In an embodiment, the plurality of diffusively reflecting elements 14 comprise fibers and the distance between the fibers is on the order of the peak wavelength of the emitted radiation.

The plurality of diffusively reflecting elements 14 can comprise any shape, such as spheres, cubes, rectangles, triangles, and/or the like. For example, in FIG. 1, the plurality of diffusively reflecting elements 14 are sphere shaped. The plurality of diffusively reflecting elements 14 can be formed of silicon dioxide ($SiO_2$), aluminum oxide ($Al_2O_3$), magnesium fluoride ($MgF_2$), calcium fluoride ($CaF_2$), zinc oxide (ZnO), aluminum zinc oxide (AlZnO), and/or the like, with a characteristic size that is larger than or comparable to the peak wavelength of the emitted radiation from the set of light emitting diodes (not shown), where comparable means the deviation from the peak wavelength by less than an order of magnitude. In an embodiment, the characteristic size of the plurality of diffusively reflecting elements 14 is larger by an order of magnitude than the peak wavelength of the emitted radiation and the at least one transparent film including the plurality of diffusively reflecting elements 14 can include a powder material immersed within the at least one film. In an embodiment, the powder material acts as diffusive reflective or transmitting centers. The powder material can comprise $SiO_2$, $Al_2O_3$, $MgF_2$, $CaF_2$, aluminum, polytetrafluoroethylene (PTFE), a highly ultraviolet reflective expanded polytetrafluoroethylene (ePTFE) membrane (e.g., GORE® Diffuse Reflector Material), and/or the like. In an embodiment, the distribution of the powder material and the plurality of diffusively reflecting elements 14 is selected along with the position of the set of light emitting diodes (not shown) to achieve a distribution of intensity of radiation that varies throughout the surface of the diffusive layer 10 by no more than 50%.

In an embodiment, several of the films in the plurality of transparent films 12 can include a plurality diffusively reflecting elements 14. In an embodiment, each film can include a specific type of element 14 (e.g., fibers, grains, domains, and/or the like) with a specific material type, a specific characteristic size, a specific shape, and a specific arrangement with a characteristic separation distance. For example, a first film in the plurality of transparent films 12 can include a plurality of $SiO_2$ spheres, while a second film can include a plurality of prolonged aluminum reflective filaments (e.g., fibers).

It is understood that fluoropolymer films are only illustrative of various transparent materials that may be utilized. In another embodiment, one or more of the transparent films 12 can be formed of another transparent material. For example, one or more of the transparent films 12 can be formed of silicone. In still another embodiment, one or more of the transparent films 12 can comprise a composite of silicone with a plurality of diffusively reflecting or transmitting elements 14 as described herein. For example, one or more of the transparent films 12 can be formed of a silicone film and Al powder, $SiO_2$ nanoparticles, and/or the like.

Figure 2:
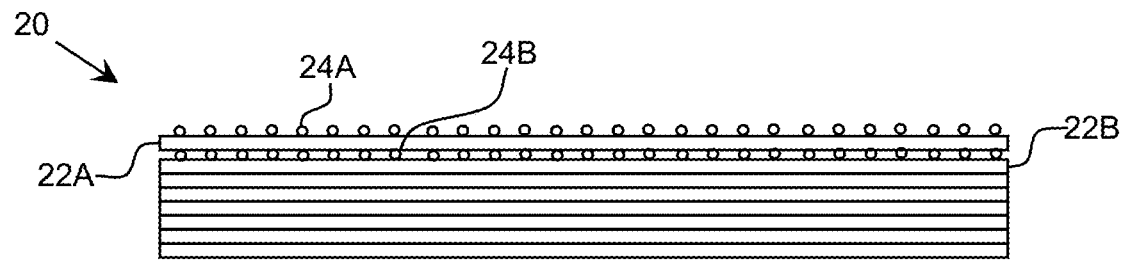
FIG. 2 shows an illustrative diffusive layer according to an embodiment.

Turning now to FIG. 2, an illustrative diffusive layer 20 according to an embodiment is shown. The diffusive layer 20 can include a plurality of transparent films 22A, 22B. The first film 22A can include a first plurality of diffusively reflecting elements 24A located on a first side and a second plurality of diffusively reflecting elements 24B located on a second side. It is understood that the first plurality of diffusively reflecting elements 24A and the second plurality of diffusively reflecting elements 24B can be the same or different. For example, a film in the plurality of transparent films 22A can include a plurality of $SiO_2$ spheres 24A on a first side and a plurality of $SiO_2$ spheres 24B on a second side. It is understood that although the plurality of spheres 24A, 24B are shown in the surface of the first film 22A and the second film 22B, as mentioned herein, the plurality of spheres 24A, 24B can be partially or completely embedded within both or either one of the first and second films 22A, 22B. Although the first plurality of diffusively reflecting elements 24A are shown as aligned with the second plurality of diffusively reflecting elements 24B, it is understood that the relative position of the plurality of diffusively reflecting elements 24A, 24B can be shifted to be not aligned with one another.

Figure 3:
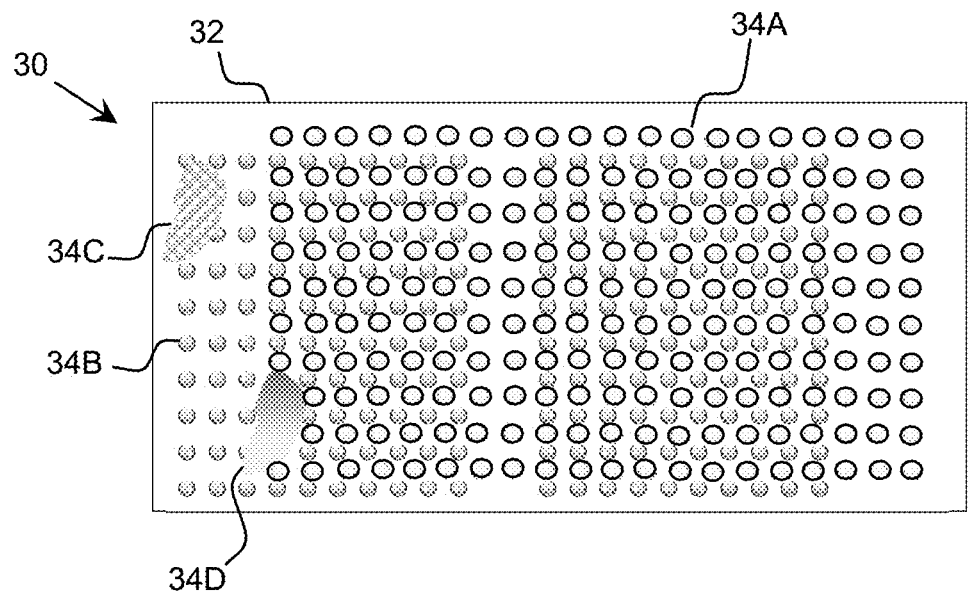
FIG. 3 shows an illustrative diffusive layer according to an embodiment.

Turning now to FIG. 3, an illustrative diffusive layer 30 according to an embodiment is shown. The diffusive layer 30 can include a transparent film 32 in the plurality of transparent films including multiple types of a plurality of elements 34A-D. Each of the plurality of elements 34A-D can be a different type of element. For example, the transparent film 32 can include a plurality of diffusive spheres 34A in parallel with a plurality of diffusive spheres 34B. The plurality of diffusive spheres 34A, 34B can be reflective and/or transmitting. The transparent film 32 can also include a plurality of partially reflective, partially transparent domains 34C. In an embodiment, the plurality of partially reflective, partially transparent domains 34C can comprise, for example, a fluoropolymer, such as polytetrafluoroethylene (PTFE) (e.g., Teflon®), silicone, and/or the like, film of varying thickness. The variation of thickness is such that the film transparency is maintained in regions transparent to UV radiation. In an embodiment, the transparency of the film is at least 30%. The reflective regions of the film can be of any desirable thickness, but should generally be on the same order of magnitude as the thickness of the transparent regions. The transparent film 32 can also include a plurality of domains 34D with variable reflective properties due to variation in the density of the aluminum reflective particles (e.g., aluminum powder) within each domain 34D.

Regardless, it is understood that for each plurality of elements 34A-D, the same or different materials can be used simultaneously. For example, $SiO_2$ can be used for one of the plurality of elements 34A-D, while $Al_2O_3$ can be used for another of the plurality of elements 34A-D. Furthermore, it is understood that the plurality of elements 34A-D can have the same or different shapes. For example, one of the plurality of elements 34A-D can comprise spheres, while the other of the plurality of elements 34A-D can comprise fibers. In addition, the transparent film 32, and any of the other embodiments of the diffusive layer discussed herein, can include a plurality of particles that are fluorescent under ultraviolet radiation in order to provide a visual indication of the ultraviolet radiation status and homogeneity. The fluorescent particles can include phosphorus, such as $Ca_5(PO_4)_3(F,Cl):Sb^{3+},Mn^{2+}$, and/or the like. In an embodiment, the concentration of the plurality of particles that are fluorescent under ultraviolet radiation can vary proportionally with the concentration of the plurality of elements 34A-D.

Figure 4:
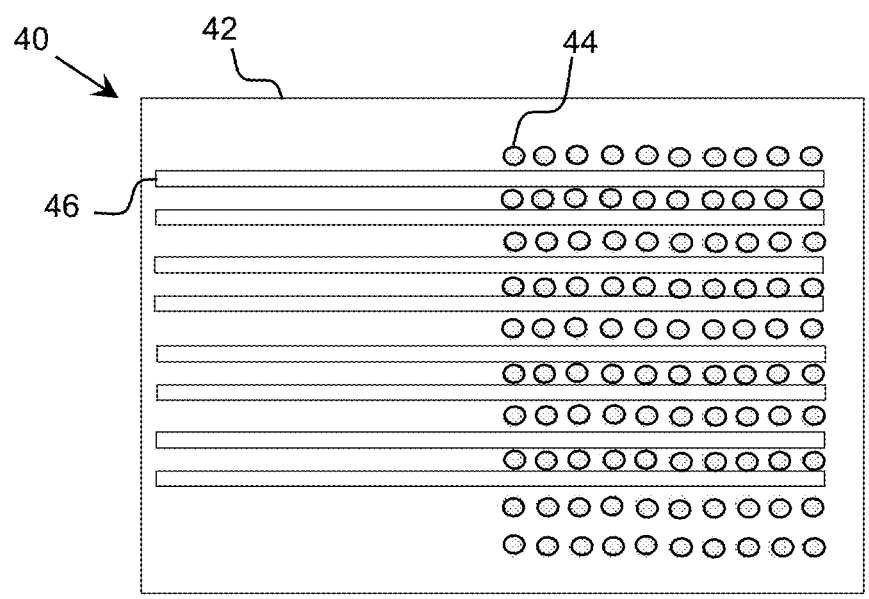
FIG. 4 shows an illustrative diffusive layer according to an embodiment.

Turning now to FIG. 4, an illustrative diffusive layer 40 according to an embodiment is shown. The diffusive layer 40 includes a plurality of transparent films 42, where at least one transparent film has a plurality of diffusive elements 44, as discussed herein with respect to the other embodiments. Although only one plurality of diffusive elements 44 are shown in the diffusive layer 40, it is understood that the diffusive layer 40 can include any number of plurality of diffusive elements 44, similar to the embodiment of the diffusive layer 30 shown in FIG. 3. In addition, the diffusive layer 40 can include a plurality of wave guiding structures 46. The plurality of wave guiding structures 46 can comprise an ultraviolet (UV) transparent material, such as $SiO_2$, $Al_2O_3$, and/or the like. The characteristic width of each of the plurality of wave guiding structures 46 is measurable in microns. For example, the width of each of the plurality of wave guiding structures 46 is approximately a few microns (e.g., 1-10 microns). Similar to optical fiber, each of the plurality of wave guiding structures 46 can comprise a core and a cladding layer (not shown). In an embodiment, the core layer and the cladding layer can be formed of different materials. The core layer can be formed of, for example, $Al_2O_3$, while the cladding layer is formed of, for example, $SiO_2$. In another example, the cladding layer can be $MgF_2$ and $CaF_2$. In an embodiment, the plurality of wave guiding structures 46 do not comprise optical fibers and can be larger light guiding structures that are capable of supporting a large number of light guiding modes. In operation, a set of light emitting diodes (not shown) can be positioned to direct and focus the radiation within these light guiding layers. The light guiding structures can be coupled (e.g., directly linked or within close proximity) to a film 42 including the plurality of diffusive elements 44.

Figure 5A:
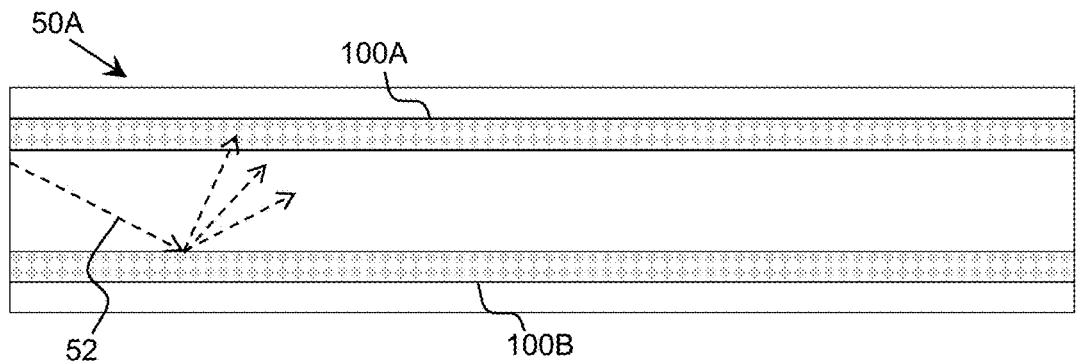
FIGS. 5A and 5B show illustrative system according to embodiments.
Figure 5B:
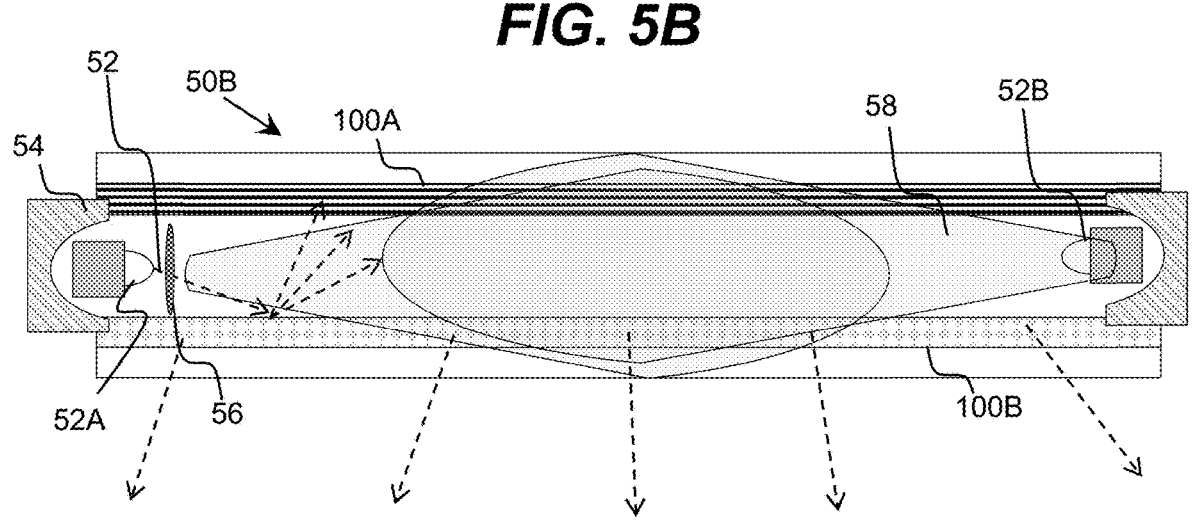

Turning now to FIGS. 5A-5B, illustrative devices 50A, 50B including a first diffusive layer 100A and a second diffusive layer 100B according to embodiments are shown. The first and second diffusive layers 100A, 100B can comprise any combination of features of diffusive layers described herein, such as the diffusive layers 10, 20, 30, 40 shown in FIGS. 1-4. The first and second diffusive layers 100A, 100B can be configured substantially identically, as shown in FIG. 5A, or the first and second diffusive layers 100A, 100B can be configured differently, as shown in FIG. 5B.

As shown in FIG. 5B, the device 50B can include a set of light emitting diodes 52A, 52B that are positioned adjacent to the diffusive layers 100A, 100B of the device 50B. For example, the set of light emitting diodes 52A, 52B can be positioned at the sides of the device 50B. In an embodiment, the set of light emitting diodes 52A, 52B can include optical reflectors 54 and/or optical lenses 56 to create the angular distribution of radiation 58 which allows for a uniform distribution of intensity over and through the diffusive layer 100B. In the embodiment shown in FIG. 5B, the first diffusive layer 100A is reflective and can comprise a composite material with reflective properties. For example, the diffusive layer 100A can include a PTFE fluoropolymer film with a plurality of aluminum fibers. Alternatively, the diffusive layer 100A can include a highly ultraviolet reflective expanded polytetrafluoroethylene (ePTFE) membrane (e.g., GORE® Diffuse Reflector Material), and/or the like. The second diffusive layer 100B is transparent and comprise at least one transparent film with a plurality of diffusive elements, as discussed herein.

Figure 6:
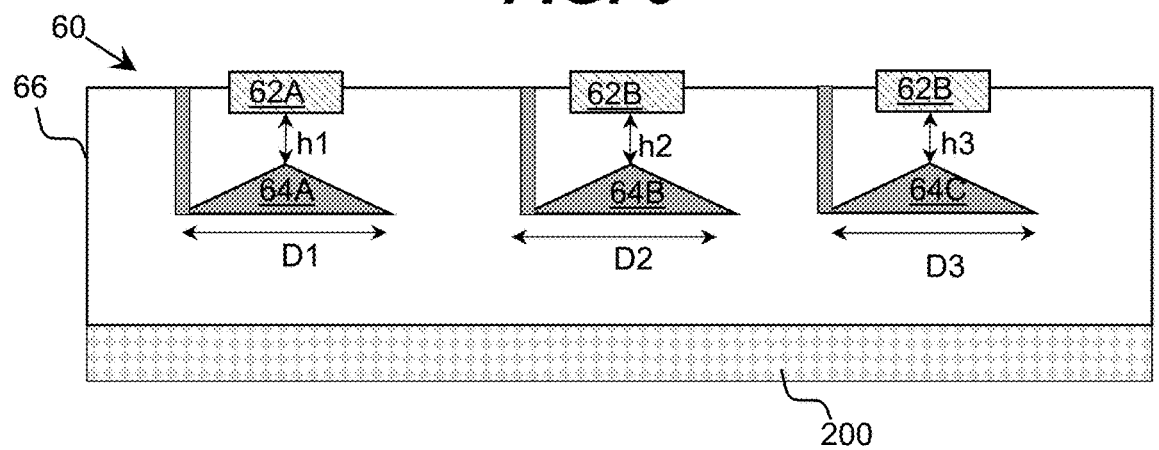
FIG. 6 shows an illustrative device according to an embodiment.

Turning now to FIG. 6, an illustrative device 60 according to an embodiment is shown. The device 60 includes a plurality of UV sources 62A-C that are each located a distance h1, h2, h3 above a respective mirror element 64A-C having a diameter D1-D3 within an enclosure 66. Further details of this device 60 are described in U.S. patent application Ser. No. 14/478,266. The mirror elements 64A-C are configured to scatter the radiation emitted from the UV sources 62A-C throughout the enclosure 66. As shown, the device 60 can include a diffusive layer 200 through which the scattered radiation exits the enclosure 66. The diffusive layer 200 can comprise any combination of features of diffusive layers described herein, such as one of the embodiments of the diffusive layers 10, 20, 30, 40 described in FIGS. 1-4. The position and size of the mirror elements 64A-C are selected to improve a uniformity of the radiation exiting the enclosure 66. In an embodiment, the mirror elements 64A-C can be partially transparent to UV radiation in order to improve the uniformity of the radiation beneath the mirror elements 64A-C.

Figure 7:
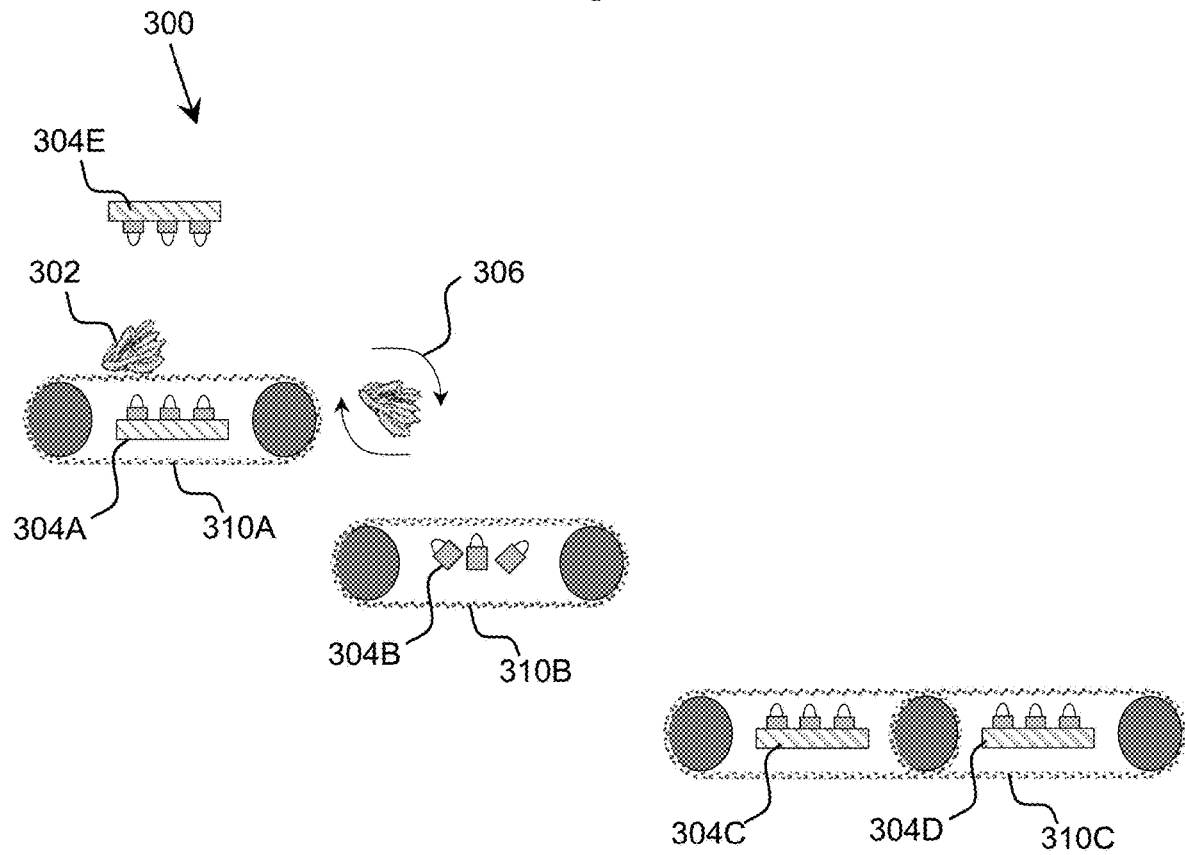
FIG. 7 shows an illustrative system according to an embodiment.

Turning now to FIG. 7, an illustrative system 300 according to an embodiment is shown. The system 300 can include a plurality of conveyor belts 310A-C, which are used to move a set of items 302 from one conveyor belt 310A-C to another in order to disinfect the set of items 302. During movement of the set of items 302 from a first conveyor belt 310A to a second conveyor belt 310B, it is understood that the set of items 302 may rotate 306 in order to improve disinfection of all the surfaces of the set of items 302. Each of the plurality of conveyor belts 310A-C can comprise any combination of features of diffusive layers described herein, such as one of the diffusive layers 10, 20, 30, 40 discussed in FIGS. 1-4. In an embodiment, at least one set of ultraviolet radiation sources 304A-D can be located within the conveyor belts 310A-C. A set of ultraviolet radiation sources 304E can also be located above the conveyor belt 310A. It is understood that a set of ultraviolet radiation sources can be located above the other conveyor belts 310B, 310C.

Figure 8:
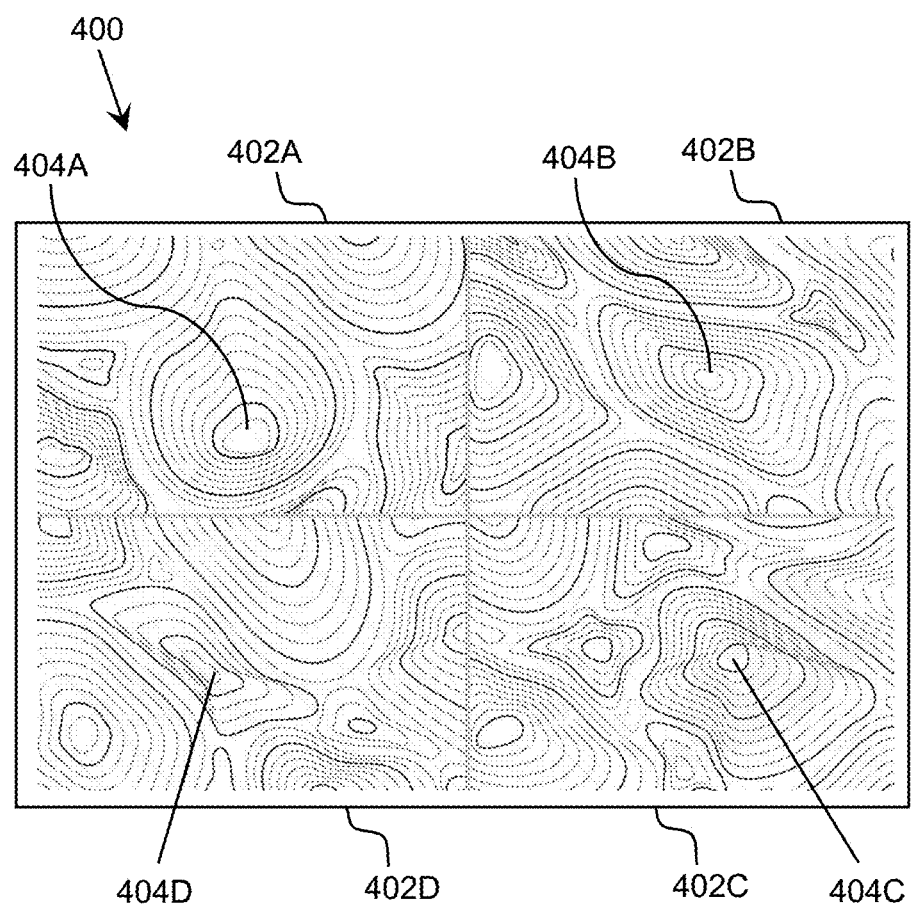
FIG. 8 shows an illustrative intensity plot according to an embodiment.

Turning now to FIG. 8, an illustrative intensity plot 400 for a device including at least one diffusive layer according to an embodiment is shown. A device, such as any of the devices 50A, 50B, 60 shown in FIGS. 5A, 5B, and 6 or a system 300 shown in FIG. 7, can include a plurality of ultraviolet radiation sources, where the radiation sources can include a UV-C source (e.g., operating in a range of 220 nanometers to 280 nanometers), a UV-B source (e.g., operating in a range of 280 nanometers to 315 nanometers), a UV-A source (e.g., operating in a range of 315 nanometers to 400 nanometers), and/or a visible source (i.e., operating in a range of 400 nanometers to 480 nanometers). In an embodiment, at least one of the ultraviolet radiation sources operate in a pulsed mode. In an embodiment, a UV-A source can operate for an extended duration of time, in the range of tens of minutes to a few hours, while a UV-C source can operate for shorter periods of time, in the range of a few to a few tens of minutes. In an embodiment, UV-A and UV-C sources alternate operation.

As shown in the intensity plot 400, a device can irradiate different domains 402A-D of a surface with different peak intensities 402A-D, depending on the target radiation required. For example, domains 402A and 402B show peak intensities 404A, 404B of UV-C sources, while domain 402C shows a peak intensity 404C for a UV-A source, and domain 402D shows a peak intensity 404D for a UV-B source.

Figure 9A:
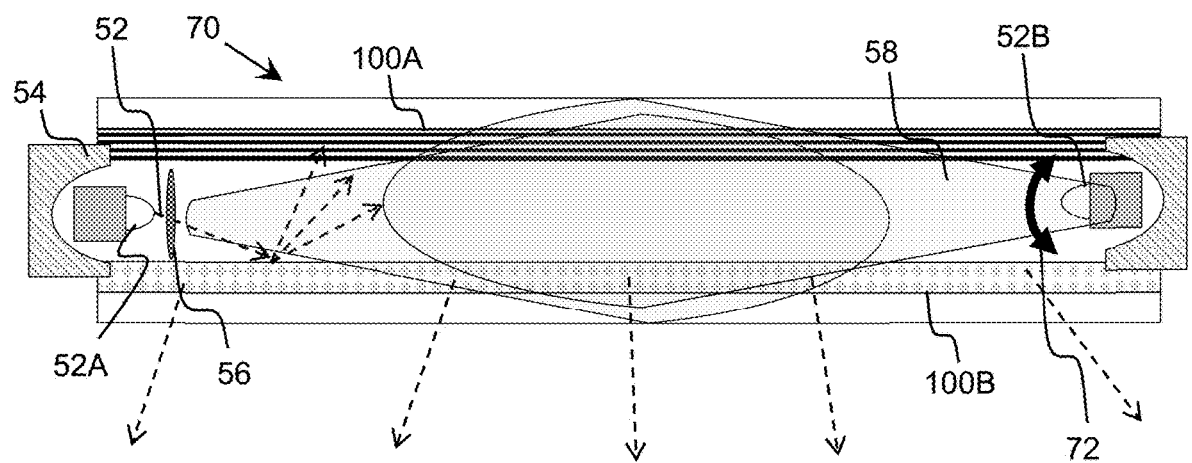

In an embodiment, the domains 402A-D can comprise periodic regions. In another embodiment, the domains 402A-D can be dynamically illuminated where the intensity varies over time. For example, an illustrative device 70, as shown in FIG. 9A, can vary intensity according to an embodiment. The device 70 is similar to the device 50B shown in FIG. 5B. However, in an embodiment, at least one of the set of ultraviolet radiation sources 52A, 52B (e.g., the ultraviolet radiation source 52B) can oscillate 72 in order to vary the angular distribution of radiation 58 and vary the intensity. In a more specific embodiment, at least one of the set of ultraviolet radiation sources 52A, 52B can move or be angularly rotated. In an embodiment, at least one of the set of ultraviolet radiation sources 52A, 52B can operate in the UV-A range, while at least one of the set of ultraviolet radiation sources 52A, 52B can operate in the UV-C range.

Figure 9B:
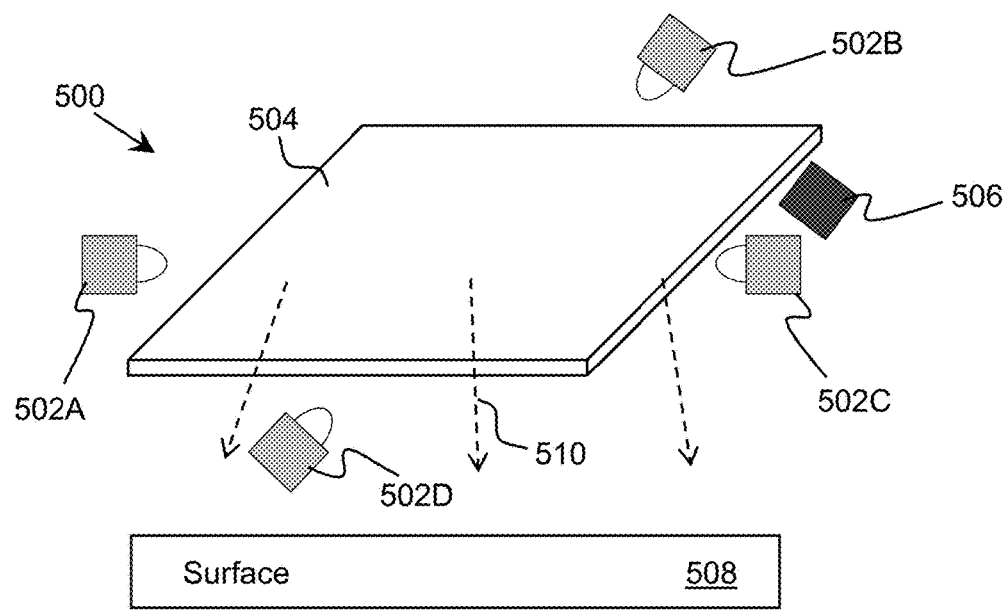
FIG. 9B shows an illustrative system according to an embodiment.

Turning now to FIG. 9B, an illustrative system 500 according to an embodiment is shown. The system 500 can include a plurality of ultraviolet radiation sources 502A-D and a diffusive layer 504. In an embodiment, each of the ultraviolet radiation sources 502A-D can have a characteristic wavelength (e.g., peak emission wavelength) that differs from the characteristic wavelength of one or more of the other ultraviolet radiation sources 502A-D. The diffusive layer 504 can include any combination of features of diffusive layers described herein, such as one of the diffusive layers 10, 20, 30, 40 discussed in FIGS. 1-4. In an embodiment, the system 500 can include at least one sensor 506 that is used to measure fluorescent radiation from a surface 508 being irradiated by the ultraviolet radiation 510. The system 500 can include a control system to receive the fluorescent radiation data in order to adjust the wavelength, intensity, and/or location of the radiation emitted by one or more of the ultraviolet radiation sources 502A-D over the surface 508 in order to adjust the resulting radiation 510 irradiating the surface 508.

Figure 10:
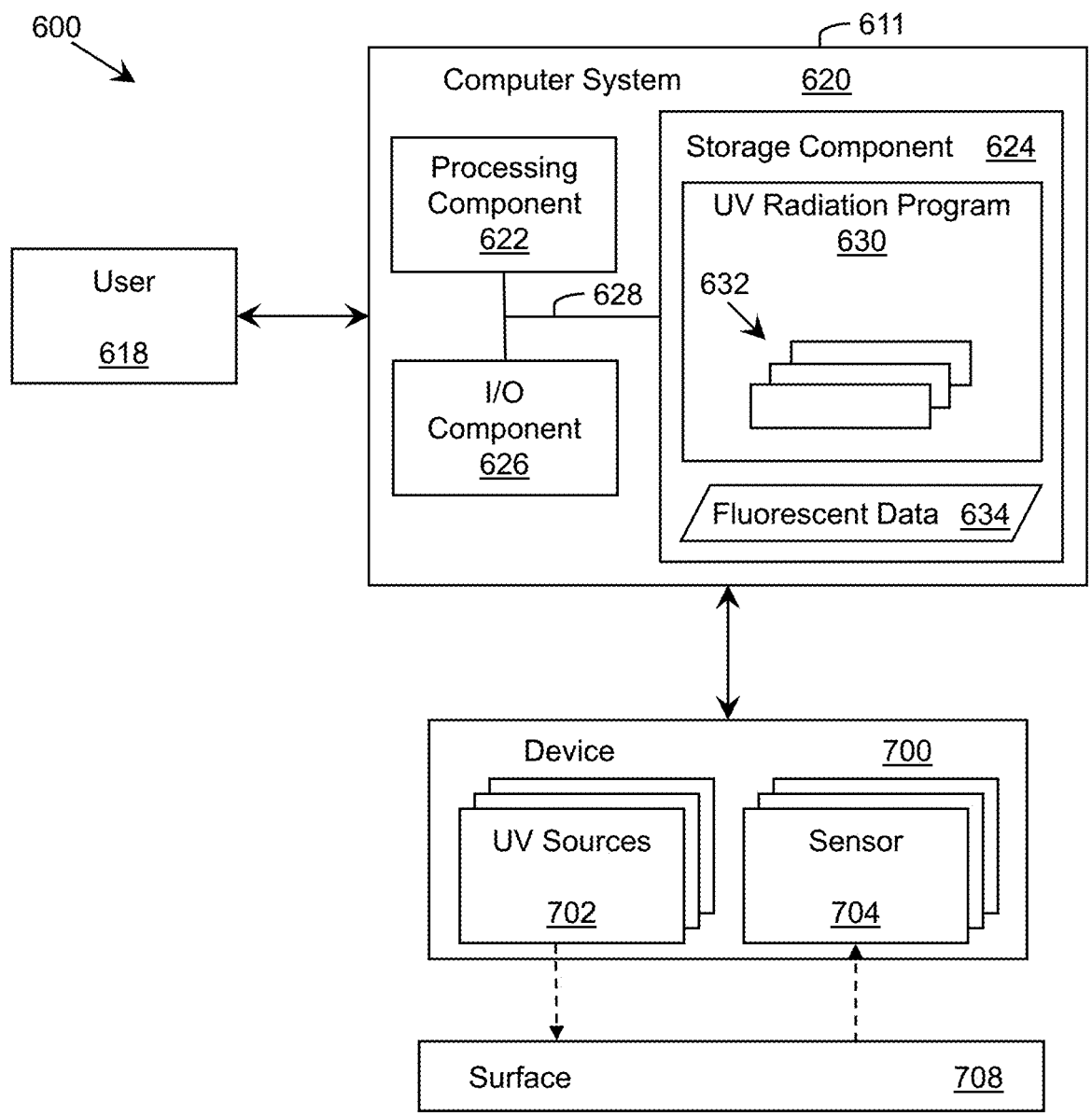
FIG. 10 shows an illustrative system according to an embodiment.

Turning now to FIG. 10, an illustrative system 600 according to an embodiment is shown. To this extent, the system 600 includes a control system 611, shown implemented as a computer system 620, that can perform a process described herein in order to operate a device 700 including a set of ultraviolet radiation sources 702 to emit ultraviolet radiation towards a surface 708 and a set of sensors 704 to measure fluorescent radiation from the surface 708. In particular, the computer system 620 is shown including an ultraviolet radiation program 630, which makes the computer system 620 operable to control and just ultraviolet radiation from the set of ultraviolet radiation sources 702 in the device 700 by performing a process described herein. In an embodiment, the computer system 620 can further receive and process data regarding fluorescent radiation at the surface 708 received by the set of sensors 704.

The computer system 620 is shown including a processing component 622 (e.g., one or more processors), a storage component 624 (e.g., a storage hierarchy), an input/output (I/O) component 626 (e.g., one or more I/O interfaces and/or devices), and a communications pathway 628. In general, the processing component 622 executes program code, such as the ultraviolet radiation program 630, which is at least partially fixed in storage component 624. While executing program code, the processing component 622 can process data, which can result in reading and/or writing transformed data, such as fluorescent data 634, from/to the storage component 624 and/or the I/O component 626 for further processing. The pathway 628 provides a communications link between each of the components in the computer system 620.

The I/O component 626 can comprise one or more human I/O devices, which enable a human user 618 to interact with the computer system 620 and/or one or more communications devices to enable a system user 618 to communicate with the computer system 620 using any type of communications link. To this extent, the ultraviolet radiation program 630 can manage a set of interfaces (e.g., graphical user interface(s), application program interface, and/or the like) that enable human and/or system users 618 to interact with the ultraviolet radiation program 630 and the fluorescent data 634. Furthermore, the ultraviolet radiation program 630 can manage (e.g., store, retrieve, create, manipulate, organize, present, etc.) the data, such as fluorescent data 634, using any solution.

The I/O component 624 also can comprise one or more I/O interfaces and/or devices, which enables the computer system 620 to operate and/or receive data from the device 700. In an embodiment, the I/O component 626 and device 700 are configured to enable the computer system 620 to selectively operate each of the set of ultraviolet radiation sources 702 individually. Alternatively, the I/O component 624 and device 700 can be configured to enable the computer system 620 to selectively operate sub-groups of the set of ultraviolet radiation sources 702 individually. In the latter case, a sub-group can be defined as a group of ultraviolet radiation sources 702 configured to generate light having substantially the same peak wavelength. Similarly, the I/O component and device 700 can be configured to enable the computer system 620 to selectively operate set of sensors 704 individually or a sub-groups as described herein.

In any event, the computer system 620 can comprise one or more general purpose computing articles of manufacture (e.g., computing devices) capable of executing program code, such as the ultraviolet radiation program 630, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, the ultraviolet radiation program 630 can be embodied as any combination of system software and/or application software.

Furthermore, the ultraviolet radiation program 630 can be implemented using a set of modules 632. In this case, a module 632 can enable the computer system 620 to perform a set of tasks used by the ultraviolet radiation program 630, and can be separately developed and/or implemented apart from other portions of the ultraviolet radiation program 630. As used herein, the term "component" means any configuration of hardware, with or without software, which implements the functionality described in conjunction therewith using any solution, while the term "module" means program code that enables a computer system 620 to implement the actions described in conjunction therewith using any solution. When fixed in a storage component 624 of a computer system 620 that includes a processing component 622, a module is a substantial portion of a component that implements the actions. Regardless, it is understood that two or more components, modules, and/or systems may share some/all of their respective hardware and/or software. Furthermore, it is understood that some of the functionality discussed herein may not be implemented or additional functionality may be included as part of the computer system 620.

When the computer system 620 comprises multiple computing devices, each computing device can have only a portion of the ultraviolet radiation program 630 fixed thereon (e.g., one or more modules 632). However, it is understood that the computer system 620 and the ultraviolet radiation program 630 are only representative of various possible equivalent computer systems that may perform a process described herein. To this extent, in other embodiments, the functionality provided by the computer system 620 and the ultraviolet radiation program 630 can be at least partially implemented by one or more computing devices that include any combination of general and/or specific purpose hardware with or without program code. In each embodiment, the hardware and program code, if included, can be created using standard engineering and programming techniques, respectively.

Regardless, when the computer system 620 includes multiple computing devices, the computing devices can communicate over any type of communications link. Furthermore, while performing a process described herein, the computer system 20 can communicate with one or more other computer systems using any type of communications link. In either case, the communications link can comprise any combination of various types of optical fiber, wired, and/or wireless links; comprise any combination of one or more types of networks; and/or utilize any combination of various types of transmission techniques and protocols.

As discussed herein, the control system 611 is configured to operate components of the device 700 to generate ultraviolet radiation directed towards a surface 708 and detect fluorescent radiation emitted from the surface 708. The ultraviolet radiation sources 702 in the device 700 can comprise high intensity, wide coverage sources that are capable of continuous operation in an efficient manner over a large stretch of time. In an embodiment, the device 700 can include UV-A and/or UV-B sources capable of operating continuously for a duration of several days.

It is understood that both UV-C and UV-A sources are capable of producing a distributed intensity over an area at a certain distance from the UV sources where distances can range from a few centimeters to several meters. As used herein, irradiation of a location defines a region of the surface that is impinged by radiation, wherein the intensity of radiation deposited at the boundary of the region is at most 10% of the intensity of light deposited at the center of the region. It is understood that the position of irradiated locations can be adjusted to result in separate locations over the surface, wherein separate means that the intensity of radiation between the locations is no larger than 10% of the intensity in the center of the locations. In addition, these locations of irradiation can be designed to have relatively uniform radiation, with radiation intensity varying through the location of no more than several times between any two points within the location.

The UV-C and UV-A and/or UV-B radiation sources can comprise any combination of one or more ultraviolet radiation emitters. Examples of an ultraviolet radiation emitter include, but are not limited to, high intensity ultraviolet lamps (e.g., high intensity mercury lamps), discharge lamps, ultraviolet LEDs, super luminescent LEDs, laser diodes, and/or the like. In an embodiment, the set of ultraviolet radiation sources 702 can include a set of light emitting diodes (LEDs) manufactured with one or more layers of materials selected from the group-III nitride material system (e.g., $Al_xIn_yGa_{1-x-y}N$, where $0 \le x$, $y \le 1$, and $x+y \le 1$ and/or alloys thereof). Additionally, the set of ultraviolet radiation sources 702 can comprise one or more additional components (e.g., a wave guiding structure, a component for relocating and/or redirecting ultraviolet radiation emitter(s), etc.) to direct and/or deliver the emitted radiation to a particular location/area, in a particular direction, in a particular pattern, and/or the like. Illustrative wave guiding structures include, but are not limited to, a wave guide, a plurality of ultraviolet fibers, each of which terminates at an opening, a diffuser, and/or the like.

In an embodiment, each ultraviolet radiation source in the set of ultraviolet radiation sources 702 can operate at a different peak wavelength ($\lambda$). In one embodiment, each of the ultraviolet radiation sources in the set of ultraviolet radiation sources 702 can irradiate a different location of the surface 708. In one embodiment, the ultraviolet radiation sources 702 can irradiate each location with relatively uniform radiation. In another embodiment, more than one ultraviolet radiation source 702 can be used to irradiate a single location on the surface, with each irradiating the common location at a different intensity of radiation.

In an embodiment, at least one of the ultraviolet radiation sources in the set of ultraviolet radiation sources 702 operates in the lower UV-A to upper UV-C range. The at least one ultraviolet radiation source can be configured to irradiate radiation at a specific wavelength selected from a range extending from 250 nm to 360 nm. In general, for adequate optimization of the irradiation that is provided by the set ultraviolet radiation sources 702, the wavelength range can be selected to be significantly narrower, depending on the type of microorganisms being sterilized at the surface 708. For instance, the wavelength range can extend from 270 nm to 320 nm, and in some cases, depending on the optimization target, the range can extend from 280 nm to 300 nm, or from 260 nm to 280 nm. In one embodiment, the set of ultraviolet radiation sources 702 can have a peak wavelength that ranges from 270 nm to 300 nm. In another embodiment, the set of ultraviolet radiation sources 702 can have a peak wavelength of 295 nm with a full width half maximum of 10 nm.

In order to facilitate the efficiency of irradiation performed by the UV-C radiation sources, a set of reflective optical elements can be used to focus the ultraviolet radiation to locations on the surface 708. In one embodiment, each optical element can be configured to focus ultraviolet radiation emitted from one of the ultraviolet radiation sources 702 to a respective location on the surface 708. Examples of optical elements that can be used in conjunction with the ultraviolet radiation sources include, but are not limited to, a lens and/or a set of lenses.

In an embodiment, the computer system 620 can also control the irradiation of the surface 708 by the set of ultraviolet radiation sources 702 to a plurality of predetermined optimal irradiation settings specified for various environmental conditions in which the surface 708 is located. In addition, the computer system 620 can adjust the irradiation settings of the set of ultraviolet radiation sources 702 as a function of measurements obtained by the set of sensors 704. Although the computer system 620 is shown to include fluorescent data 634, the computer system 620 can include other types of data. In an embodiment, the set of sensors 704 can include other sensors, in addition to a fluorescent sensor. For example, the set of sensors 704 can include environmental condition sensors such as a temperature sensor, a humidity sensor, a gas sensor, and/or the like. As such, the data received by the computer system 620 can include temperature data, humidity data, gas level data, and/or the like. In an embodiment, the data can also include data associated with the radiation by the set of ultraviolet radiation sources 702, such as the intensity, dosage, duration, wavelength, type of radiation emitted from the set of ultraviolet radiation sources 702, time duration of irradiation, and/or the like.

In one embodiment, the computer system 620 can also include a wireless transmitter and receiver that is configured to communicate with a remote location via Wi-Fi, BLUETOOTH, and/or the like. As used herein, a remote location is a location that is apart from the system 600. For example, a remote computer can be used to transmit operational instructions to the wireless transmitter and receiver. The operational instructions can be used to program functions performed and managed by the computer system 620. In another embodiment, the wireless transmitter and receiver can transmit data calculations (e.g., changes), data from the sensors to the remote computer, to facilitate further use of the light exposure control system with the surface 708.

In one embodiment, the computer system 620 can include an input component and an output component to allow the user 618 to interact with the computer system 620 and to receive information regarding the surface 708 and the operating of the set of ultraviolet radiation sources 702. In one embodiment, the input component can permit a user 618 to adjust at least one of the plurality of operating parameters for the set of ultraviolet radiation sources 702. This can include making adjustments during the operation of different radiation sources 702 and/or prior to initiating a treatment. In one embodiment, the input component can include a set of buttons and/or a touch screen to enable a user 618 to specify various input selections regarding the operating parameters. In one embodiment, the output component can include a visual display for providing status information of the surface 708, status information of the environment surrounding the surface 708, a simple visual indicator that displays whether irradiation is underway (e.g., an illuminated light), or if the irradiation is over (e.g., absence of an illuminated light).

Figure 11A:
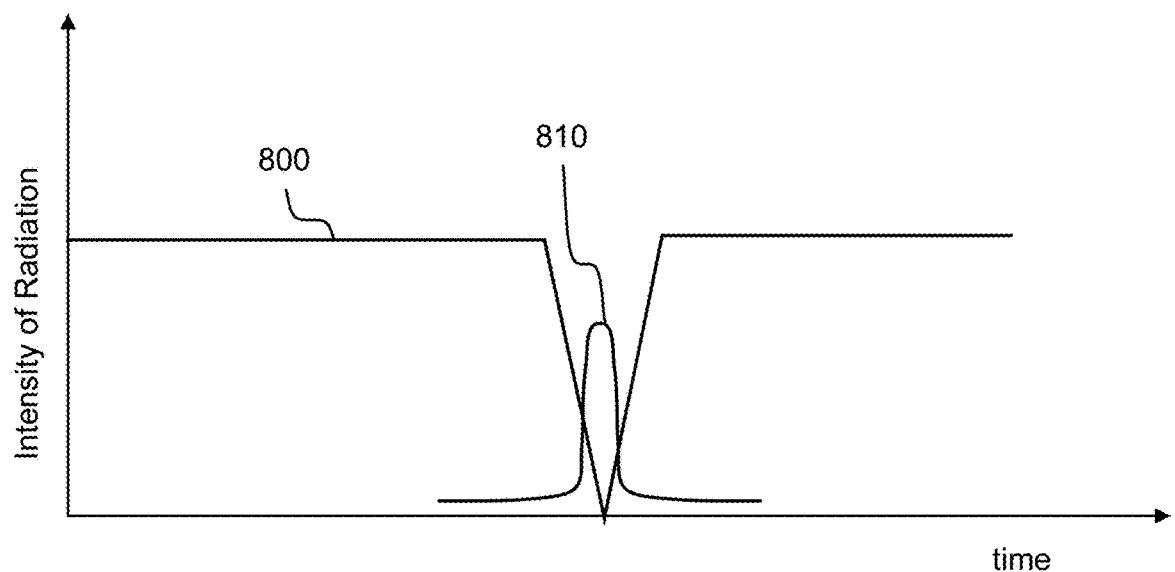
FIGS. 11A and 11B show radiation intensity and microorganism activity plots over time for an illustrative system according to an embodiment.
Figure 11B:
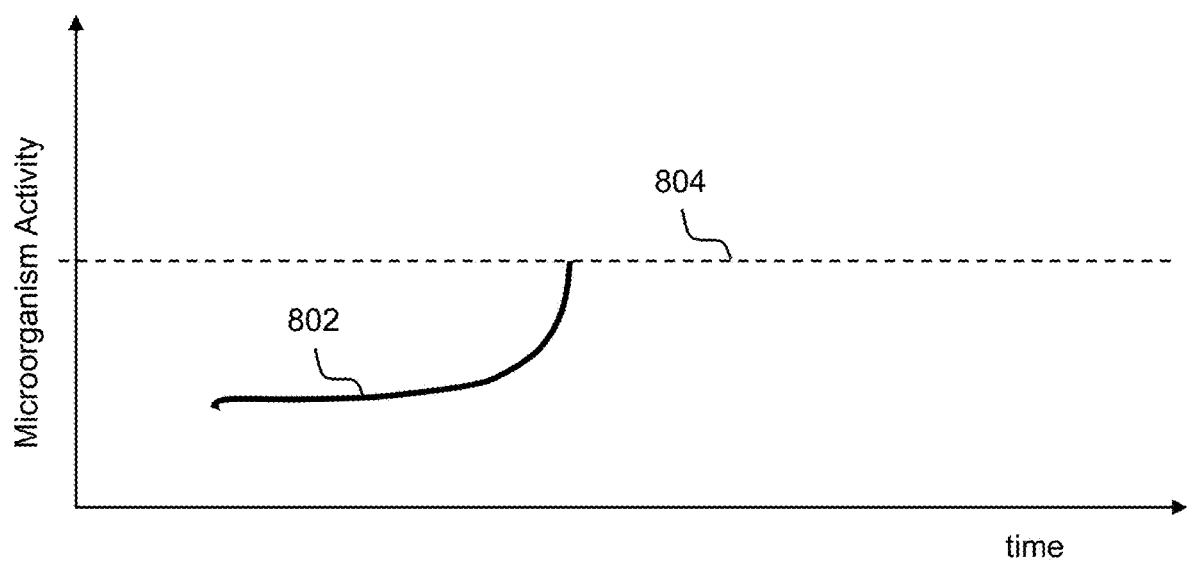

Turning now to FIGS. 11A and 11B, illustrative plots of operation of a device as a function of time according to an embodiment is shown. In particular, the system can be configured to irradiate surfaces requiring disinfection with radiation capable of eliciting fluorescent light response from the material located over a surface, wherein the initial irradiation is conducted with the purpose of determining contamination of the surface based on the amplitude of fluorescent signal sensed by a fluorescent sensor. The system can also determine whether to activate UV-C ultraviolet radiation sources or UV-A and/or UV-B radiation sources, depending on the level of contamination and the target level designated by the system. As shown in the FIG. 11A, the system may irradiate a surface with UV-A and/or UV-B radiation for prolonged period of time while monitoring the growth of microbes over a surface (e.g., radiation curve 800). Microbial activity is shown in FIG. 11B as curve 802. As can be seen, if microbial activity starts growing rapidly and exceeds a system target threshold 804, UV-C radiation (radiation curve 810) is activated to bring microbial activity within appropriate limits. Under such scenario, UV-A and/or UV-B radiation is used to maintain microbial activity to within limits over extended periods of time, while UV-C radiation is designed to rapidly suppress microbial activity.

The ultraviolet irradiation system can further include surfaces comprising photocatalyst. In an embodiment, the photocatalyst can be irradiated by an ultraviolet wavelength in the presence of water vapor to result in formation of hydroxyl group radicals and reactive oxygen species (ROS) that can effectively interact and disrupt proliferation of microorganisms. In an embodiment, the ultraviolet wavelength can be in the range of 360-380 nm. In an embodiment, the ultraviolet wavelength can be adjusted to be optimal for ROS and hydroxyl group radicals formation for each type of photocatalyst present. In an embodiment, the photocatalyst can comprise known photocatalysts in the art, such as metal oxides. For example, the photocatalyst can comprise titanium oxide ($TiO_2$), copper, silver, copper/silver particles, and/or the like. The photocatalyst surfaces have to be positioned to be in proximity and irradiated by ultraviolet light, and in close proximity to the surface to ensure that created ROS and hydroxyl radicals react mostly on the surface with microorganisms. In an embodiment, the position of photocatalyst has to be that at least 10% of resulting ROS and hydroxyl radicals reach the surface.

The system can comprise UV reflective and/or UV diffusive surfaces designed to further recycle ultraviolet radiation. In an embodiment, such surfaces can be combined with partially UV transparent surfaces designed for further reflection, recycling and light guiding UV radiation. In an embodiment, such surfaces can comprise UV partially transparent material such as silicone, fluoropolymers, $Al_2O_3$, sapphire, $SiO_2$, $CaF_2$, $MgF_2$ and/or the like.

It is understood that in any of the embodiments discussed herein, the diffusive layer can be part of a sterilization system. The sterilization system can include a feedback control system used to measure the fluorescence of the set of items being disinfected. The feedback control system can change the UV radiation intensity, distribution, and/or the like, depending on the status of the set of items being disinfected. However, it is understood that the diffusive layer can be used in various other applications. For example, the diffusive layer can be implemented as part of a system for performing ultraviolet curing. Additionally, the diffusive layer can be utilized in a horticulture ultraviolet system. In these applications, inclusion of the diffusive layer can help prevent a local overdose for the corresponding material, which can destroy or substantially damage the material.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A device, comprising:
a set of radiation sources configured to emit radiation, wherein the set of radiation sources include one or more layers of materials formed of a group III nitride material;
a transparent element located adjacent to the set of radiation sources, the transparent element configured to improve uniformity of the radiation; and
a diffusive layer located adjacent to the transparent element, wherein the diffusive layer includes a plurality of at least partially transmitting regions through which radiation exits the device, wherein the diffusive layer is at least 30% transmissive.

2. The device of claim 1, wherein the diffusive layer includes a reflective material.

3. The device of claim 1, wherein the transparent element is configured to scatter the radiation emitted from the set of radiation sources.

4. The device of claim 1, further comprising a light guiding structure coupled to the diffusive layer.

5. The device of claim 1, wherein in the diffusive layer includes a plurality of diffusive elements, wherein a characteristic size of the plurality of diffusive elements is comparable to or larger than a peak wavelength of the emitted radiation.

6. The device of claim 5, wherein the plurality of diffusive elements form a set of clusters of diffusive elements, wherein a characteristic size of each cluster is at most 5% of the characteristic size of the plurality of diffusive elements.

7. The device of claim 1, wherein the set of radiation sources include at least one radiation source operating in an ultraviolet radiation range.

8. The device of claim 1, wherein the set of radiation sources include at least one visible light source.

9. A device, comprising:
- a set of radiation sources configured to emit radiation, wherein the set of radiation sources include one or more layers of materials formed of a group III nitride material, and wherein at least two radiation sources operate at different peak wavelengths; and
- a diffusive layer located adjacent to the set of radiation sources, wherein the diffusive layer includes a set of transmitting regions through which radiation exits the device, wherein the diffusive layer is at least 30% transmissive.

10. The device of claim 9, wherein the diffusive layer includes a reflective material.

11. The device of claim 9, further comprising a transparent element located adjacent to the set of radiation sources, the transparent element configured to scatter the radiation emitted from the set of radiation sources in order to improve uniformity of the radiation.

12. The device of claim 9, further comprising a light guiding structure coupled to the diffusive layer.

13. The device of claim 9, wherein the diffusive layer further includes a plurality of diffusive elements, wherein a characteristic size of the plurality of diffusive elements is comparable to or larger than at least one of the different peak wavelengths.

14. The device of claim 13, wherein the plurality of diffusive elements form a set of clusters of diffusive elements, wherein a characteristic size of each cluster is at most 5% of the characteristic size of a totality of the plurality of diffusive elements.

15. An enclosure, comprising:
- a set of radiation sources configured to emit radiation, wherein the set of radiation sources include one or more layers of materials formed of a group III nitride material, and wherein at least two radiation sources operate at different peak wavelengths;
- an optical lens located adjacent to the set of radiation sources; and
- a diffusive layer located adjacent to the optical lens, wherein the diffusive layer includes a set of transmitting regions through which radiation exits the device, wherein the diffusive layer is at least 30% transmissive.

16. The enclosure of claim 15, wherein the diffusive layer includes a reflective material.

17. The enclosure of claim 15, wherein the optical lens is configured to scatter the radiation emitted from the set of radiation sources.

18. The enclosure of claim 15, wherein the set of radiation sources include at least one visible light source.

19. The enclosure of claim 15, wherein the diffusive layer further includes a plurality of diffusive elements, wherein a characteristic size of the plurality of diffusive elements is comparable to or larger than at least one of the different peak wavelengths.

20. The enclosure of claim 19, wherein the plurality of diffusive elements form a set of clusters of diffusive elements, wherein a characteristic size of each cluster is at most 5% of the characteristic size of a totality of the plurality of diffusive elements.

* * * * *